(12) United States Patent
Kang

(10) Patent No.: US 11,209,694 B2
(45) Date of Patent: Dec. 28, 2021

(54) POLARIZING STRUCTURE AND DISPLAY DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Chih Tsung Kang, Chongqing (CN)

(73) Assignees: HKC Corporation Limited, Shenzhen (CN); Chongqing HKC Optoelectronics Technology, Chongqing (CN)

( * ) Notice: Subject to any disclaimer, the term of this patent is extended or adjusted under 35 U.S.C. 154(b) by 0 days.

(21) Appl. No.: 17/043,654

(22) PCT Filed: Nov. 8, 2018

(86) PCT No.: PCT/CN2018/114450
§ 371 (c)(1),
(2) Date: Sep. 30, 2020

(87) PCT Pub. No.: WO2020/062458
PCT Pub. Date: Apr. 2, 2020

(65) Prior Publication Data
US 2021/0033920 A1    Feb. 4, 2021

(30) Foreign Application Priority Data
Sep. 30, 2018   (CN) .......................... 201811163051.0

(51) Int. Cl.
*G02F 1/1335* (2006.01)
*G02B 5/30* (2006.01)
(Continued)

(52) U.S. Cl.
CPC ..... *G02F 1/133528* (2013.01); *G02B 5/3083* (2013.01); *G02F 1/13363* (2013.01); *G02F 1/133602* (2013.01)

(58) Field of Classification Search
CPC .................................................. G02F 1/1335
See application file for complete search history.

(56) References Cited

U.S. PATENT DOCUMENTS

2006/0103795 A1* 5/2006 Ikeno ................ G02F 1/133632
349/117
2007/0159576 A1* 7/2007 Tanabe .................... G02B 1/14
349/96

(Continued)

FOREIGN PATENT DOCUMENTS

| CN | 1860404 A | 11/2006 |
|---|---|---|
| CN | 101086590 A | 12/2007 |

(Continued)

OTHER PUBLICATIONS

International Search Report of PCT/CN2018/114450.

*Primary Examiner* — Sang V Nguyen
(74) *Attorney, Agent, or Firm* — Rosenberg, Klein & Lee

(57) ABSTRACT

Disclosed in the present disclosure is a polarizing structure, including a pressure sensitive adhesive layer having a smaller refractive index and provided with a plurality of grooves; an optical compensation film having a larger refractive index, on which are provided with a plurality of protruding structures associated with the grooves. Further provided is a display device.

16 Claims, 5 Drawing Sheets

(51) Int. Cl.
  *G02F 1/13357*   (2006.01)
  *G02F 1/13363*   (2006.01)

(56) References Cited

U.S. PATENT DOCUMENTS

| | | | | |
|---|---|---|---|---|
| 2008/0297712 | A9* | 12/2008 | Nagai | G02F 1/134363 |
| | | | | 349/141 |
| 2010/0277674 | A1* | 11/2010 | Watanabe | B29C 39/20 |
| | | | | 349/96 |
| 2011/0317114 | A1* | 12/2011 | Kim | G02F 1/133632 |
| | | | | 349/117 |
| 2016/0252665 | A1* | 9/2016 | Lee | G02F 1/133528 |
| | | | | 359/489.07 |
| 2017/0242169 | A1* | 8/2017 | Hida | C09B 43/32 |
| 2018/0151539 | A1* | 5/2018 | Nakamura | H01L 27/3267 |
| 2018/0292710 | A1* | 10/2018 | Takada | G02F 1/133308 |

FOREIGN PATENT DOCUMENTS

| | | | | |
|---|---|---|---|---|
| CN | 101118299 | A | 2/2008 | |
| CN | 101158778 | * | 4/2008 | B32B 7/02 |
| CN | 101158778 | A | 4/2008 | |
| CN | 102870019 | A | 1/2013 | |
| CN | 103885106 | A | 6/2014 | |
| CN | 104062798 | A | 9/2014 | |
| CN | 104091898 | A | 10/2014 | |
| CN | 104252016 | A | 12/2014 | |
| CN | 105929476 | A | 9/2016 | |
| CN | 207833175 | U | 9/2018 | |
| JP | 2000258772 | A | 9/2000 | |
| KR | 20100075136 | A | 7/2010 | |

* cited by examiner

POLARIZING STRUCTURE AND DISPLAY DEVICE

CROSS REFERENCE TO RELATED APPLICATIONS

This application is a U.S. National Stage Entry of International Application No. PCT/CN2018/114450, filed on Nov. 8, 2018, which claims priority to Chinese Patent Application No. 201811163051.0, filed on Sep. 30, 2018, titled as "Polarizing structure, display panel and display device", the entire content of which is incorporated herein in its entirety.

FIELD

The present disclosure relates to the fields of display technologies, in particular a polarizing structure and display device.

BACKGROUND

With the development of the display technologies, display devices have been widely applied due to the advantages such as high image quality, power saving, thin profile and the like, and the level of the image quality may be the most important factor affecting the customer experience. A display device is generally constituted by a backlight device and a display device placed on the backlight device, which provides incident light for the display panel. Since the incident light normally goes into the display panel perpendicularly in a centralized way, a better display image quality can be obtained when viewing the display in the front view direction, but a poor image quality having a relatively critical color shift when viewing the display in a side view direction, causing the normal displaying angle smaller. Currently, in a VA liquid crystal (Vertical Alignment Liquid Crystal) display, a method of dividing a sub-pixel in a filter into secondary-pixels is used to improve the image quality viewed at the side view angle, expanding the viewing angle. However, this method requires more TFT (Thin Film Transistor) components to drive the secondary-pixels, which will inevitably increase the metal traces inside the panel, causing a light transmissive area to be smaller, affecting the transmittance of the panel, and the image quality. However, in order to ensure the brightness of the light, it is necessary to improve the performance of the backlight device to generate incident light in higher illuminance, which in turn increases the cost for the backlight.

SUMMARY

According to various embodiments of the present disclosure, provided is a polarizing structure which can improve that a display viewing angle of the display device is small, a side view image quality is poor, while the cost may not be increased.

In addition, further provided is a display device.

Provided is a polarizing structure, including:

a pressure sensitive adhesive layer including a light incident surface and a light emitted surface on which are provided grooves having a predetermined shape, and an angle between a side surface of the groove and the light incident surface is an acute angle;

an optical compensation film formed on the light emitted surface of the pressure sensitive adhesive layer; and a first refractive index of the optical compensation film is greater than a second refractive index of the pressure sensitive adhesive layer; a surface of the optical compensation film contacting the light emitted surface is provided with protruding structures associated with the groove in shape and size; and a polarizer formed on the optical compensation film.

In one of the embodiments, the polarizing structure further includes:

a support protective film disposed on the polarizer, which is doped with resin particles in a predetermined concentration.

In one of the embodiments, the polarizing structure further includes:

a support protective film disposed on the polarizer; and an optical film having an anti-reflection effect, disposed on the support protective film.

In one of the embodiments, the first refractive index ranges from 1.0 to 2.5.

In one of the embodiments, the second refractive index ranges from 1.0 to 2.5.

In one of the embodiments, the difference between the first refraction index and the second refraction index ranges from 0.01 to 2.

In one of the embodiments, the support protective film includes a polyethylene terephthalate film.

In one of the embodiments, the support protective film includes a triacetyl cellulose film.

In one of the embodiments, the support protective film includes a polymethyl methacrylate film.

In one of the embodiments, the polarizer includes a polyvinyl alcohol film.

In one of the embodiments, the optical compensation film is a single optical axis negative compensation film, the first refractive index is an ordinary refractive index of the single optical axis negative compensation film, and the single optical axis negative compensation film contains liquid crystal molecules.

In one of the embodiments, the polarizer has a transmission axis, the light having a polarization direction parallel to the transmission axis can pass the polarizer, and an optical axis of the single optical axis negative compensation film is orthogonal to the transmission axis.

In one of the embodiments, the protruding structure is a V-shaped strip-like protruding structure, and the V-shaped strip-shaped protruding structures are parallel to each other.

In one of the embodiments, the protruding structure is a triangular prism protruding structure, and the triangular prism protruding structures are distributed in a two-dimensional matrix array on the light emitted surface.

In one of the embodiments, the distance of the adjacent protruding structures in the first direction is greater than or equal to the length of the protruding structures in the first direction and less than or equal to 10 μm; and the first direction is the direction perpendicular to the extending direction of the v-shaped strip-shaped protruding structure on the light emitted surface.

In one of the embodiments, a surface of the optical compensation film contacting the light emitted surface is a rectangle, and the distance of the adjacent triangular prism protruding structures in the first direction is greater than or equal to the length of the triangular prism protruding structure in the first direction and less than or equal to 10 μm;

The distance of the adjacent triangular prism protruding structures in the second direction is greater than or equal to the length of the triangular prism protruding structure in the second direction and less than or equal to 10 μm; and the extending direction of the rectangle width is the first direction, and the extending direction of the rectangle length is the second direction.

Provided is a polarizing structure, including:

a pressure sensitive adhesive layer including a light incident surface and a light emitted surface on which are provided triangular-prism-shaped grooves, and an angle between a side surface of the triangular-prism-shaped groove and the light incident surface is an acute angle;

an optical compensation film formed on a light emitted surface of the pressure-sensitive adhesive layer; and a first refractive index of the optical compensation film is greater than a second refractive index of the pressure-sensitive adhesive layer; a surface of the optical compensation film contacting the light emitted surface is provided with triangular prism protruding structures associated with the triangular pyramid-shaped grooves in shape and size; the optical compensation film is a single optical axis negative compensation film; and a polarizer formed on the optical compensation film.

Provided is a display device, including:

a backlight device configured to provide a light source;

a display panel placed on a side of the backlight device, configured to display an image;

and the display panel includes a polarizing structure, which includes:

a pressure sensitive adhesive layer including a light incident surface and a light emitted surface on which are provided grooves having a predetermined shape, and an angle between a side surface of the groove and the light incident surface is an acute angle;

an optical compensation film formed on the light emitted surface of the pressure sensitive adhesive layer; and a first refractive index of the optical compensation film is greater than a second refractive index of the pressure sensitive adhesive layer; a surface of the optical compensation film contacting the light emitted surface is provided with protruding structures associated with the groove in shape and size; and a polarizer formed on the optical compensation film.

In one of the embodiments, the display panel is a liquid crystal display panel.

In one of the embodiments, the display panel is an organic electroluminescent display panel.

In case of the polarizing structure and the display device described above, since there are provided with the pressure sensitive adhesive layer and the optical compensation film and the first refractive index is greater than the second refractive index, i.e. where the light goes from light incident surface of the pressure sensitive adhesive layer into the pressure sensitive adhesive layer and passes through the pressure sensitive adhesive layer into the optical compensation film, that is, from the optical sparse medium into the optical dense medium, a refraction phenomenon may occur at the interface between the two films, causing the light to be deflected. Since most of the light goes perpendicularly onto the light incident surface in the display device, in the exemplary technique, the surface of each layer of the polarizing plate is flat and orthogonal to the normal incident light, most of the incident light is emitted perpendicularly when perpendicularly going onto the polarizing plate, causing the image quality at the front view angle better and the image quality at the side view angle poorer. In this solution instead, the surface of the optical compensation film contacting the light emitted surface is formed with a protruding structure, the side surface of which forms an acute angle with the light incident surface. After the normal incident light goes onto the optical compensation film, the incident angle formed on the surface of the protruding structure is less than 90°, so that a refraction phenomenon occurs to deflect the normal incident light, so that the energy at the front view angle is diffused to the direction at the side view angle, improving the image quality at the side view angle. Further, since the entire polarizing structure does not use any additional metal traces, there is no problem affecting the transmittance of the light, affecting the image quality.

BRIEF DESCRIPTION OF THE DRAWINGS

To illustrate the embodiments of the present disclosure more clearly, the accompanying drawings for describing the embodiments are introduced briefly in the following. Apparently, the accompanying drawings in the following description are only some embodiments of the present disclosure.

DETAILED DESCRIPTION OF THE EMBODIMENTS

To facilitate the understanding of the present disclosure, the present disclosure will be described more thoroughly hereinafter with reference to the accompanying drawings. The accompanying drawings provide the advantageous embodiments of the present disclosure. The present disclosure may, however, be embodied in many different forms and should not be construed as limited to the embodiments set forth herein. Rather, the object for providing these embodiments is to understand this disclosure more thoroughly.

A display device is generally constituted by a backlight device and a display device placed on the backlight device, which provides incident light for the display panel. Since the incident light normally goes into the display panel perpendicularly in a centralized way, a better display image quality can be obtained when viewing the display in the front view direction, but a poor image quality having a relatively critical color shift when viewing the display in a side view direction, causing the normal displaying angle smaller.

Figure 1:
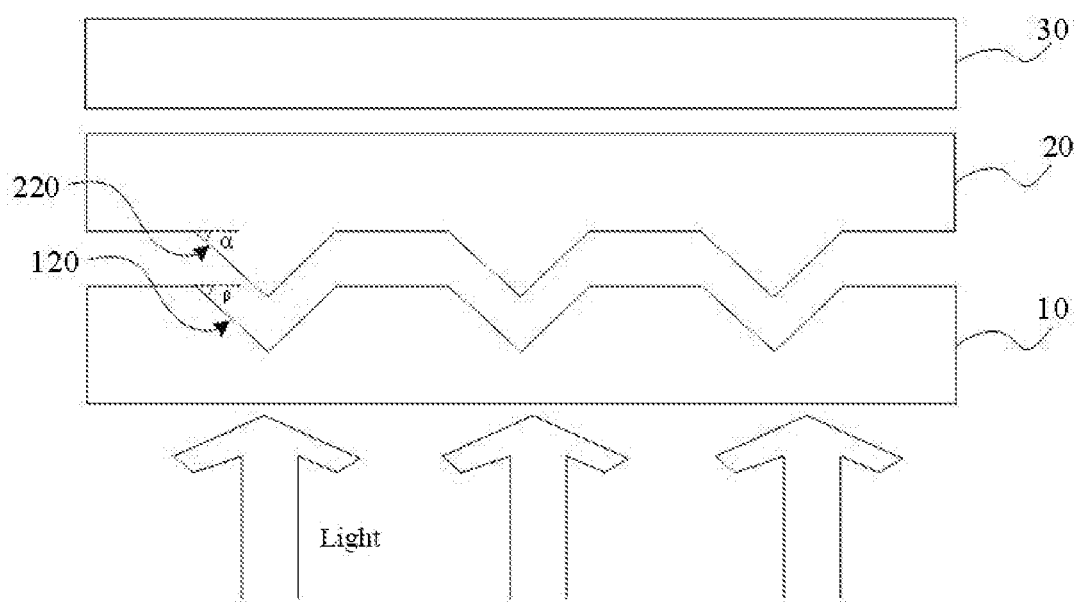
FIG. 1 is a schematic diagram showing the composition of a polarizing structure in an embodiment.

Referring to FIG. 1, it is a schematic diagram of the polarizing structure in an embodiment. Meantime further referring to FIG. 2, a polarizing structure may include: a pressure sensitive adhesive layer, an optical compensation film 20 and a polarizer 30. The pressure sensitive adhesive layer 10 includes a light incident surface and a light emitted surface. The light incident surface is a surface receiving the incident light. The light enters the pressure sensitive adhesive layer 10 through the incident surface and emitted from the light emitted surface. On the light emitted surface are provided with grooves 120 having a predefined shape. The angle between the side surface of the groove 120 and the light incident surface is α which is an acute angle, satisfying 0°<α<90°. The optical compensation film 20 is formed on the light emitted surface of the pressure sensitive adhesive layer. On the on surface of the optical compensation film 20 contacting the light emitted surface are provided with protruding structures 220 associated with the groove 120 in shape and size. That is, the pressure sensitive adhesive layer 10 and the optical compensation film 20 can be completely conformed by the protruding structure 220 and the groove 120. The optical compensation film 20 has a first refractive index n1. The pressure sensitive adhesive layer 10 has a second refractive index n2. The first refractive index n1 is greater than the second refractive index n2. Where the light enters the optical compensation film 20 through the pressure sensitive adhesive layer 10, that is, from the optical sparse medium into the optical dense medium, a refraction may occur at the interface between the two films. In the display device, since the most of the light goes perpendicularly into the polarizing plate, i.e. the most of the light is perpendicular to the light incident surface, this solution changes the propagation path of the normal incident light, causing the light to be deflected, so that the light energy at the front view angle is diffused to the direction at the side view angle, improving the image quality at the side view angle, by means of that the normal incident light is subjected to a refraction at the surface of the protruding structure 220 when the normal incident light goes through the pressure sensitive adhesive layer 10 onto the optical compensation film 20 in combination with the surface characteristics of the protruding structure 220 by providing the pressure sensitive adhesive layer 10 and the optical compensation film 20 with different refractive indices and providing the protruding structure 220 on the surface of the optical compensation film 20 contacting the light emitted surface.

In the above embodiment, by providing protruding structures on the optical compensation film and simultaneously refracting the incident light caused by the refractive index different from that of the pressure-sensitive adhesive layer, the incident light going perpendicularly to the optical compensation film can be refracted, directing the light energy at the front view angle to the direction at the side view angle, to solve the problem of the color shift. Further, since the entire polarizing structure does not adopt any additional metal traces, thus there is no problem affecting the transmittance of the light and further affecting the image quality.

Figure 4:
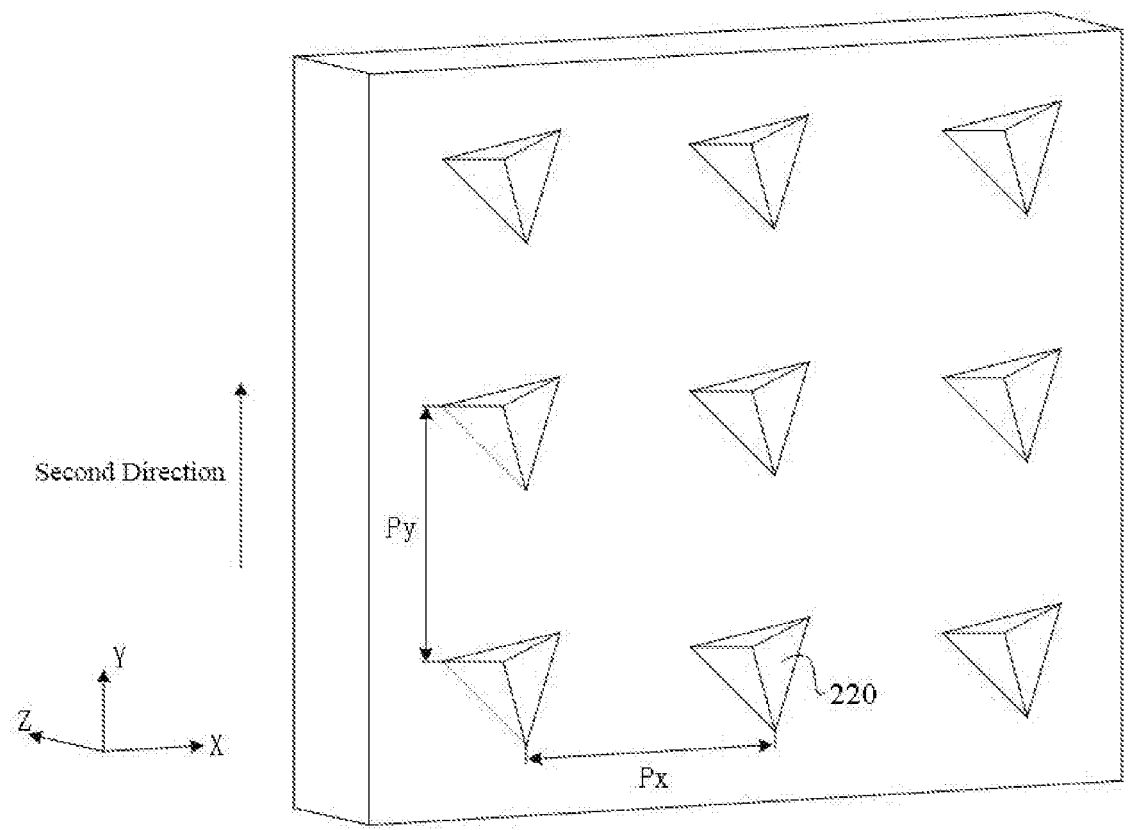
FIG. 4 is a perspective diagram of an optical compensation film in another embodiment.

In one of the embodiments, always referring to FIG. 1, on the surface of the optical compensation film 20 contacting the pressure sensitive adhesive layer 10 are provided protruding structures 220. The plurality of the protruding structures 220 are triangular prism strip-like structures, which are parallel to each other. One side surface of the triangular prism strip-like structure contacts the surface of the optical compensation film 20 contacting the pressure sensitive adhesive layer 10, and the contacting surface of the optical compensation film 20 is also the light incident surface. Furthermore, between the other two side surfaces and the light incident surface of the optical compensation film 20 is formed an angle, i.e. a in FIG. 1. Since the angle formed between the side surface of the groove 120 on the pressure sensitive adhesive layer 10 and the light incident surface is an acute angle, so β is an acute angle. Correspondingly, the angle α formed between the side surface of the protruding structure 220 and the light incident surface is an acute angle as well, while the protruding structure 220 and the groove 120 are the same in shape and size, thus here α=β. Further, the first selectable range of β may be 0°<β<90°, and the second selectable range may be 15°<β<75°. The first selectable range of α may be 0°<α<90°, and the second selectable range may be 15°<α<75°. Providing an angle between the side surface of the protruding structure 220 and the light incident surface can make the refractive effect more likely to occur when the incident light passes through the side surface, so that the light energy at the front view angle is more diffused to the direction at the side view angle, improving the image quality at the side view angle. As shown in FIG. 4, the plurality of the protruding structures 220 may be distributed in a two-dimensional matrix array on the light incident surface of the optical compensation film 20, and the protruding structure 220 is a triangular-prism protrusion. It should be understood that it may have a cross section as same as that of the triangular prism strip-like structure when the protruding structure 220 is a triangular-prism protrusion. The bottom surface of the triangular prism is in contact with the light incident surface of the optical compensation film 20, and the remaining side surfaces form an angle with the light incident surface of the optical compensation film 20. Because of having the same cross section as the triangular prism strip-like structure, thus the angle here is also a in FIG. 1. Since the angle formed between the side surface of the groove 120 of the pressure sensitive adhesive layer 10 and the light-incident surface is an acute angle, thus β is an acute angle, and accordingly, an angle α formed between the side surface of the protruding structure 220 and the light incident surface is also an acute angle, while the protruding structure 220 is associated with the groove 120 in shape and size, so α=β here. When the protruding structures 220 are triangular prism strip-like structures and are arranged side by side, the refraction occurs only in the one-dimensional direction, to diffuse the light to both sides of the inclined surface of the triangular prism. When the protruding structure 220 is a triangular prism and triangular prisms are in a two-dimensional matrix array, refraction may occur in a two-dimensional plane, causing the light to be diffused to various angles of the two-dimensional plane, so that a good image quality can be represented at various view angles.

Figure 2:
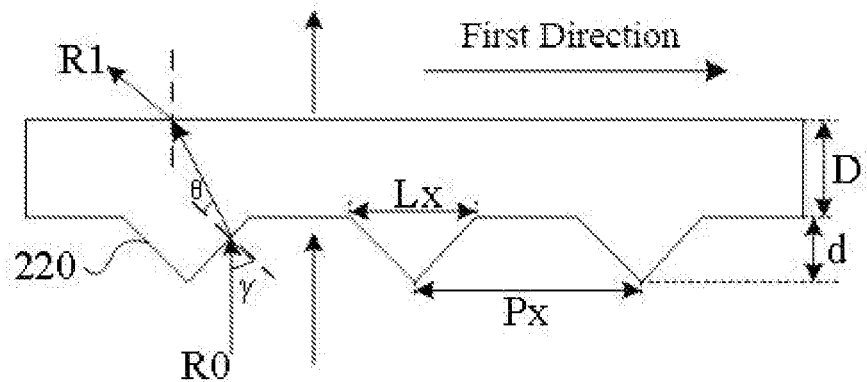
FIG. 2 is a structural diagram of an optical compensation film in FIG. 1.

As shown in FIG. 2, when the light R0 vertically passes through the pressure sensitive adhesive layer 10 into the optical compensation film 20, the incident angle of the normal incident light at the surface of the protruding structure 220 is γ, 0<γ<90°, so the light may be subjected to refraction, the angle of refraction is θ. γ is larger than θ because the light enters the optical compensation film 20 (optical dense medium) having the first refractive index from the pressure sensitive adhesive layer 10 (optical sparse medium) having the second refractive index. That is, the light propagation path changes, the light R1 deviates from the original normal incident direction, and is diffused sidely, so that more light goes to the side, improving the image quality at the side view angle. It should be understood that the larger the difference between the first refractive index n1 and the second refractive index n2, the larger the refractive angle at which refraction occurs, and the easier it is to diffuse the front view light type energy to a large viewing angle. In an embodiment, the first refractive index n1 ranges from 1.0<n1<2.5, and the second refractive index n2 ranges from 1.0<n2<2.5. In an embodiment, if m=n1−n2, the range of m is 0.01<m<2.

Figure 3:
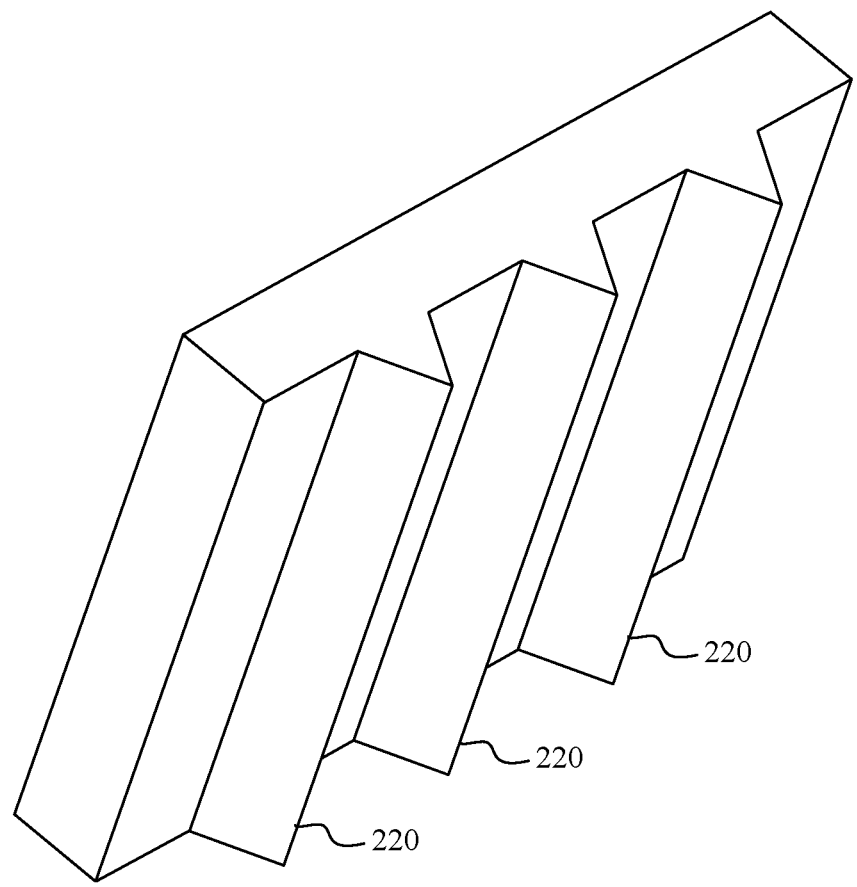
FIG. 3 is a perspective diagram of the optical compensation film in an embodiment.

As shown in FIG. 2 while referring to FIG. 3 at the same time, the pressure sensitive adhesive layer 10 may include a light-incident surface and a light emitting surface. The light emitting surface and the light incident surface may be rectangles that are the same in shape and size, or may also be other shapes. When the protruding structure 220 is a triangular prism strip-like structure (V-shaped strip-like protruding structure), the spacing between the adjacent triangular prism protrusions in the first direction is greater than or equal to the length of the triangular prism protrusion in the first direction and less than or equal to 10 Here, the first direction is the direction perpendicular to the extending direction of the triangular prism strip-like protruding structure on the light emitting surface, and can also be understood as the extending direction along the X axis. The triangular prism may be a regular triangular prism or an irregular triangular prism. The plurality of triangular prisms may be the same or different in size. The plurality of triangular prism protruding structures 220 are parallel to each other on the light emitting surface. As shown in FIG. 1, Px is the distance between the adjacent triangular prism strip-like structures, Lx is the length of the triangular prism strip-like structure in the first direction, and Px, Lx satisfy: Px≥Lx, and Px≤10 μm.

Similarly, when the protruding structure 220 is a triangular prism protruding structure, since it can have the same cross section as the triangular prism protrusion. Therefore, it can be referred to FIG. 2 and FIG. 4 at the same time, the distance of the adjacent triangular prism protruding structures 220 is greater than or equal to the length of the triangular prism protruding structure 220 in the first direction and less than or equal to 10 μm. The distance of the adjacent triangular prism protruding structures 220 in the second direction is greater than or equal to the length of the triangular prism protruding structure 220 in the second direction and less than or equal to 10 μm which is the opening size of a general pixel. In one embodiment, since the surface of the optical compensation film 20 that is in contact with the light emitted surface is a rectangle, the extending direction of the rectangular width is the first direction that can also be understood as along the extending direction of the X-axis. The extending direction of the rectangular length is the second direction that here can also be understood as along the direction of extension the Y axis. The triangular prism may be a regular triangular pyramid or may be an irregular triangular prism, and the plurality of triangular prisms may have the same size or may be different in size. As shown in FIG. 4, Px is the distance between the adjacent triangular prism protruding structures 220 in the first direction, Py is the distance of the adjacent triangular prism protruding structures 220 in the second direction, Lx is the length of the triangular prism protruding structure 220 in the first direction, Ly is the length of the triangular prism protruding structure 220 in the second direction. Px, Py, Lx, and Ly satisfy: Px≥Lx; Py≥Ly, and Px≤10 μm, and Py≤10 μm. When Px>Lx, Py>Ly, there is a gap between the adjacent protruding structures 220, that is, the protruding structures 220 are represented in a two-dimensional matrix array, and when the light propagates from the optical sparse medium to the optical dense medium, it is possible then to enable the normal incident light to be diffused sidely by means of the gaps and the protrusions, which further directs the light energy at the front view to the side view angle to improve the image quality of the side view angle.

Further, when the protruding structure is a V-shaped strip-like shape, the plurality of the V-shaped strip-like protruding structures may also be represented in a two-dimensional matrix array, and the two-dimensional arrangement manner thereof may refer to the above description of the triangular prism protruding structure, which will not be described again hereto. Because of the gap between the adjacent protruding structures, the protruding nodes are represented in a two-dimensional matrix array. When the light propagates from the optical sparse medium to the optical dense medium, it is possible then to enable the normal incident light to be diffused sidely by means of the gaps and the protrusions, which further directs the light energy at the front view to the side view angle to improve the image quality of the side view angle.

The optical compensation film 20 may be a single optical axis negative compensation film made of a light transmissive transparent or translucent material and having a phase compensation function. In one embodiment, the optical compensation film 20 inside is filled with liquid crystals, and the liquid crystal is birefringent material, and the light when entering the liquid crystal may be refracted into a normal light and abnormal light, and the refractive index of the normal light is the ordinary refractive index, the refractive index of the abnormal light is the extraordinary refractive index, and the direction of the extraordinary refractive index is the direction of the optical electric field parallel to the optical axis of the liquid crystal, the direction of the ordinary refractive index is the direction of the optical axis perpendicular to the optical axis of the liquid crystal. The direction of the extraordinary refractive index is perpendicular to the direction of the ordinary refractive index. In the present embodiment, the optical compensation film 20 also has an extraordinary refractive index and an ordinary refractive index. The ordinary refractive index of the optical compensation film 20 can be denoted as ns. In the present embodiment, the first refractive index is the ordinary refractive index ns of the optical compensation film 20. The direction of the ordinary refractive index ns is parallel to the light incident surface.

Further, the second refractive index of the pressure sensitive adhesive layer 10 is also an ordinary refractive index, that is, no (ordinary refractive index). The ordinary refractive index of the optical compensation film 20 is greater than the ordinary refractive index of the pressure-sensitive adhesive layer 10. In other words, the pressure-sensitive adhesive layer 10 is an optical sparse medium with respect to the optical compensation film 20, and the optical compensation film 20 is an optical dense medium with respect to the pressure sensitive adhesive layer 10. In one embodiment, the difference of the normal refractive indices between the optical compensation film 20 and the pressure sensitive adhesive layer 10 ranges from 0.01 to 2. Theoretically, the greater the difference in the ordinary refractive index of the optical compensation film 20 with respect to the ordinary refractive index of the pressure sensitive adhesive layer 10, the easier it is to direct the light energy at the front view angle to the side view angle when occurring the refractive effect while the incident light goes onto the optical compensation film 20 perpendicularly.

The polarizer 30 has an absorption axis and a transmission axis, and the polarizing light having a polarization direction parallel to the transmission axis can pass through the polarizer. In one embodiment, in order to reduce the polarization effect of the optical compensation film on the light, the optical axis (liquid crystal axis) of the optical compensation film may be parallel to the transmission axis of the polarizer, and the polarization direction of the incident light after passing through the optical compensation film is parallel to the transmission axis of the polarizer and thus can completely pass through the polarizer. In the present solution, since the optical compensation film also has a function of phase compensation, the use of the optical compensation film can also function as a phase compensation in addition to deflecting the incident light at the interface to expand the viewing angle, and enhancing the side view image quality.

In the exemplary technique, polyvinyl alcohol is generally used as a polarizer. While polyvinyl alcohol has extremely strong hydrophilicity, in order to protect the physical properties of the polarizer, it substantially absorbs and passes the polarized light. The polarizer 30 of the present disclosure is selected from the common products currently on the market, and its transmission axis is parallel to the direction of 0/180 degrees, and the absorption axis is parallel to the direction of 90/270 degrees. It is usually required to dispose a layer of triacetate cellulose support film on both sides of the polarizer. The triacetate cellulose support film has high light transmittance, water resistance and a mechanical strength, and can protect the polarizer. In the present embodiment, since the pressure sensitive adhesive layer 10 and the optical compensation film 20 are provided on one side of the polarizer, the pressure sensitive adhesive layer 10 and the optical compensation film 20 can perform phase compensation and deflect the light, and can also serve as a protective layer for the polarizer. It should be noted that the pressure sensitive adhesive layer 10 and the optical compensation film 200 are required to have a suitable thickness to achieve the protection effect on the polarizer.

Figure 5A:
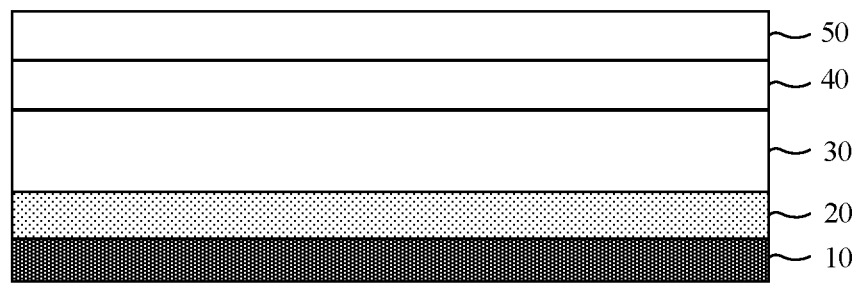
FIG. 5A is a schematic diagram showing the composition of a polarizing structure in an embodiment.
Figure 5A:

In one of the embodiments, as shown in FIG. 5A, the polarizing structure may include: a pressure sensitive adhesive layer 10, an optical compensation film 20, a polarizer 30, and a support protective film 40, and an optical film 50 provided on the support protective film 40 having an anti-reflection function. The optical film 50 may be coated on the light emitted surface of the support protective film 40 to enable the support protective film 40 to have the anti-reflection function. The thickness of the coated optical film is not particularly limited, which may be other thicknesses.

The material of the support protective film 40 may be any one of a polyethylene terephthalate film, a triacetate cellulose film, or a polymethyl methacrylate film. PET (Polyethylene terephthalate, polyethylene terephthalate film) has good optical properties and weather resistance, and amorphous PET plastic has good optical transparency. In addition, PET plastics have excellent wear resistance, dimensional stability and electrical insulation. TAC (Triacetyl Cellulose, triacetate cellulose) is substantially used to protect LCD polarizers. PMMA (Polymethyl Methacrylate, polymethyl methacrylate) has good chemical stability and weather resistance. In the present application, the support protective film 40 can also serve to support and protect. Illustratively, the thickness of the optical compensation film 20 may be from 20 micrometers to 200 micrometers.

Figure 5B:
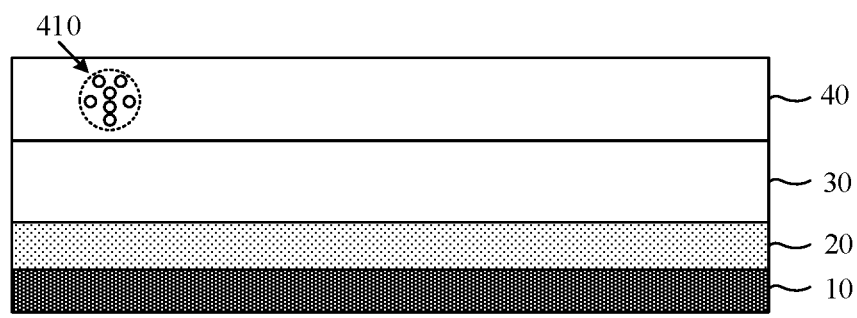
FIG. 5B is a schematic diagram showing the composition of a polarizing structure in another embodiment.
Figure 5B:
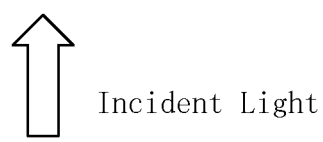

In one of the embodiments, as shown in FIG. 5B, the resin particle 410 may be further doped in the support protective film 40 to enable the optical compensation film 30 to have the anti-vertigo function. The specific doping concentration is not particularly limited.

In summary, in conjunction with FIG. 1 and FIG. 2, taking the groove of the pressure-sensitive adhesive layer 10 is a V-shaped strip-like groove, and the protruding structure of the optical compensation film 20 is a V-shaped strip-like protruding structure (triangular prism) as an example, the principle of viewing angle improvement of the present application is briefly described: the incident light after entering the optical compensation film 20 can be divided into horizontally polarized and vertically polarized components. Since the transmission axis of the polarizing film used in the present application is parallel to the direction at 0/180 degree, thus it is here focused only on the media interface through which the light of the horizontally polarized component passes. The equivalent refractive index of the optical compensation film 20 corresponding to the light of the horizontally polarized component is nc, and the light of the horizontally polarized component passes through the pressure sensitive adhesive layer 10 (the refractive index corresponding to the pressure sensitive adhesive layer 10 is ns). Therefore, the horizontally polarized light is subjected to the operation to enter the optical dense medium from the optical sparse medium (nc>ns) at the contact surface of the two media (i.e., the V-shaped strip-like protrusions in FIG. 2), generating the refraction effect in association with the acute angle formed between the protruding structure 220 of the optical compensation film 20 and the incident light to form an optical phenomenon that distributes the light type energy at the front view angle to a larger viewing angle. In one embodiment, the light energy at the front view angle is directed to the side view angle to improve the problem of color shift.

Further provided is a polarizing structure. The polarizing structure may include: a pressure sensitive adhesive layer, including a light incident surface and a light emitted surface, on the light emitted surface provided grooves having a triangular prism shape, an angle between the side surface of the triangular prism protruding structure and the light incident surface being an acute angle; an optical compensation film, formed on the light emitted surface of the pressure sensitive adhesive layer; and a first refractive index of the optical compensation film is greater than a second refractive index of the pressure sensitive adhesive layer; on a surface of the optical compensation film contacting the light emitted surface are provided with protruding structures associated with the triangular-prism-shaped grooves in shape and size; a polarizer formed on the optical compensation film.

In the above embodiment, by providing protruding structures on the optical compensation film and simultaneously refracting the incident light caused by the refractive index different from that of the pressure-sensitive adhesive layer, the incident light going perpendicularly to the optical compensation film can be refracted, directing the light energy at the front view angle to the direction at the side view angle, to solve the problem of the color shift. Further, since the entire polarizing structure does not adopt any additional metal traces, thus there is no problem affecting the transmittance of the light and further affecting the image quality.

Figure 6:
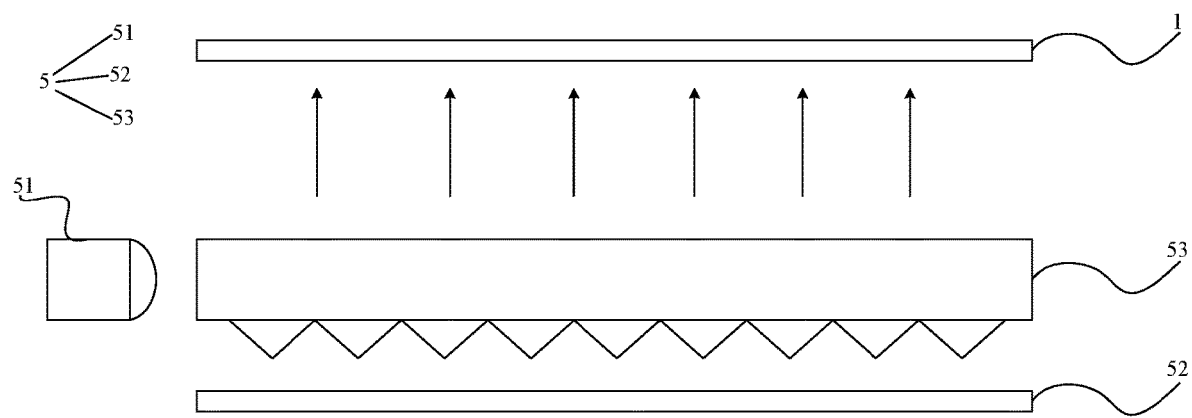
FIG. 6 is a schematic diagram showing the composition of a display device in an embodiment.

Referring to FIG. 6, it is a schematic diagram of the composition of a display device in an embodiment. The present disclosure also discloses a display device including a backlight device 5 and a display panel 1 disposed on the backlight device. The backlight device 5 is configured to provide incident light R0, which is goes onto the display panel 1 in a range of a small angle from the normal direction, and the small angle θ may be less than 30°. Most of the light received by the display panel 1 is the normal incident light. Since the pressure sensitive adhesive layer 10 and the optical compensation film 20 are present in the display panel 1 and the light incident surface of the optical compensation film 20 is provided with protruding structures 220 having a predetermined shape, the surface of the protruding structure 220 may deflect the normal incident light to generate the emitted light R1 by refraction, distributing energy at the front view angle to the side view angle, improving the image quality of the side view angle. The backlight device 5 can include a side-entry LED light source 51, a reflective sheet 52, and a light guide plate 53. The upper and lower surfaces of the light guide plate 53 are both provided with an elongated V-shaped groove. The side wall of the V-shaped groove on the lower surface of the light guide plate 53 is parallel to the side-entry light source 51, and the V-shaped groove on the upper surface of the light guide plate 53 is perpendicular to the V-shaped groove on the lower surface.

Figure 7:
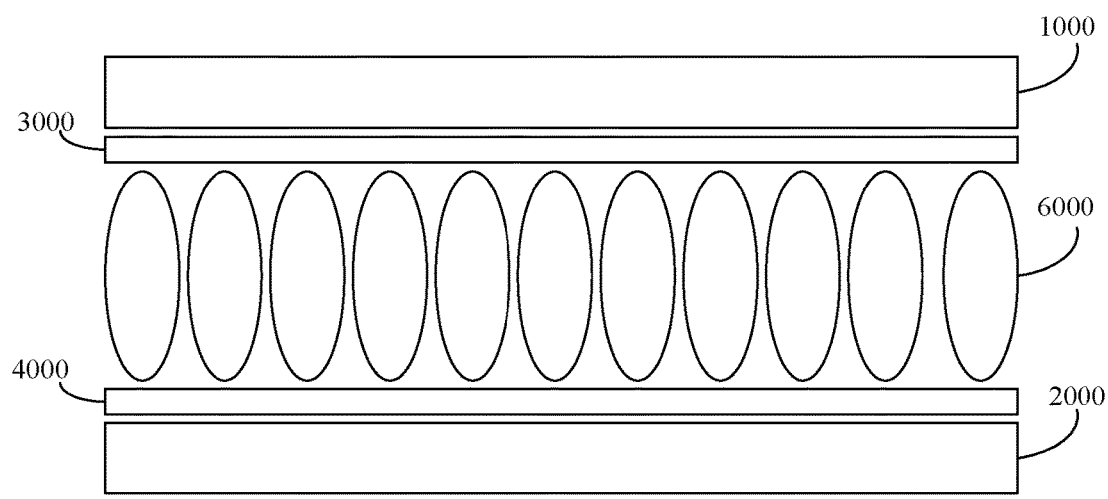
FIG. 7 is a schematic diagram showing the composition of the display panel in FIG. 6.

Referring to FIG. 7, it is a schematic diagram of the composition of the display panel in FIG. 6. The display panel 1 may for example a LCD (Thin Film Transistor Liquid Crystal Display) display panel, an OLED (Organic Light-Emitting Diode) display panel, a QLED (Quantum Dot Light Emitting Diodes) display panel, a curved display panel or other display panels. The present application is described by taking a LCD display panel as an example. As shown in FIG. 7, the display panel includes an upper polarizing plate 1000, a lower polarizing plate 2000, an upper substrate 3000, a lower substrate 4000, and a liquid crystal layer 6000 interposed between the upper substrate 300 and the lower substrate 4000. The incident sequence of the light into the display panel is: first entering the lower polarizing plate 2000, then passing through the lower substrate 4000, next passing through the liquid crystal layer 6000, after deflected by the liquid crystal layer 6000 entering the upper substrate 3000, and finally entering the upper polarizing plate 1000, and the upper polarizing plate 100 is the polarizing structure described in the embodiments of the polarizing structure described above. The upper polarizing plate 1000 may include a pressure sensitive adhesive layer 10. The pressure sensitive adhesive layer has a second refractive index. The pressure sensitive adhesive layer 10 includes a light incident surface and a light emitted surface. On the light emitted surface are provided with grooves 120 having a predetermined shape. The angle between the side surface of the groove 120 and the light incident surface is an acute angle. The upper polarizing plate 1000 may further include an optical compensation film 20 formed on the light emitted surface of the pressure sensitive adhesive layer 10, and the optical compensation film 20 has a first refractive index. The first refractive index of the optical compensation film 20 is greater than the second refractive index of the pressure sensitive adhesive layer 10. A surface of the optical compensation film 20 contacting the light emitted surface is provided with protruding structures 220 associated with the grooves in shape and size. The upper polarizing plate 1000 may further include a polarizer formed on the optical compensation film 20. The upper polarizing plate 1000 may further include a second compensation film 40 formed on the polarizer. After passing through the lower polarizing plate 2000, the light enters the upper polarizing plate 1000 to go to the pressure sensitive adhesive layer 10 in the upper polarizing plate 1000, and penetrates the pressure sensitive adhesive layer 10 to enter the optical compensation film 20. Since the light enters the optical dense medium from the optical sparse medium, and the incident angle of the incident light on at least part of the contact surface is not equal to 90°, a refraction phenomenon occurs, causing the normal incident light to be deflected toward the side viewing angle, and the energy at the front view angle is distributed to the side viewing angle, improving the image quality of the side angle of view. The specific structure of the polarizing structure has been described in detail above, and will not be described hereto again.

What is claimed is:

1. A polarizing structure, comprising:
a pressure sensitive adhesive layer, comprising a light incident surface and a light emitted surface on which are provided a plurality of grooves having a predetermined shape, and an angle between a side surface of the groove and the light incident surface being an acute angle; the light entering the pressure sensitive adhesive layer through the light incident surface and emitted from the light emitted surface;
an optical compensation film, formed on the light emitted surface of the pressure sensitive adhesive layer; wherein a first refractive index of the optical compensation film is greater than a second refractive index of the pressure sensitive adhesive layer; a surface of the optical compensation film contacting the light emitted surface provided with a plurality of protruding structures associated with the groove in shape and size; the optical compensation film is a single optical axis negative compensation film; the single optical axis negative compensation film inside is filled with liquid crystals; and
a polarizer formed on the optical compensation film; the polarizer having an absorption axis and a transmission axis; an optical axis of the liquid crystal being parallel to the transmission axis of the polarizer;
wherein the protruding structure is a triangular prism protruding structure, and a plurality of the triangular prism protruding structures are distributed in a two-dimension matrix array on the light emitted surface.

2. The polarizing structure of claim 1, wherein the polarizing structure further comprises:
a support protective film, disposed on the polarizer, which is doped with resin particles in a predetermined concentration.

3. The polarizing structure of claim 1, wherein the polarizing structure further comprises:
a support protective film, disposed on the polarizer; and
an optical film having an anti-reflection effect, disposed on the support protective film.

4. The polarizing structure of claim 1, wherein the first refractive index ranges from 1.0 to 2.5.

5. The polarizing structure of claim 1, wherein the second refractive index ranges from 1.0 to 2.5.

6. The polarizing structure of claim 1, wherein the difference between the first refraction index and the second refraction index ranges from 0.01 to 2.

7. The polarizing structure of claim 2, wherein the support protective film comprises a polyethylene terephthalate film.

8. The polarizing structure of claim 2, wherein the support protective film comprises a triacetyl cellulose film.

9. The polarizing structure of claim 2, wherein the support protective film comprises a polymethyl methacrylate film.

10. The polarizing structure of claim 1, wherein the polarizer comprises a polyvinyl alcohol film.

11. The polarizing structure of claim 1, wherein the first refractive index is an ordinary refractive index of the single optical axis negative compensation film, and the single optical axis negative compensation film contains liquid crystal molecules.

12. The polarizing structure of claim 11, wherein the light having a polarization direction parallel to the transmission axis can pass the polarizer, and an optical axis of the single optical axis negative compensation film is orthogonal to the transmission axis.

13. The polarizing structure of claim 1, wherein a surface of the optical compensation film contacting the light emitted surface is a rectangle, and the distance of the adjacent triangular prism protruding structures in the first direction is greater than or equal to the length of the triangular prism protruding structure in the first direction and less than or equal to 10 μm;
the distance of the adjacent triangular prism protruding structures in the second direction being greater than or equal to the length of the triangular prism protruding structure in the second direction and less than or equal to 10 μm; wherein the extending direction of the rectangle width is the first direction, and the extending direction of the rectangle length is the second direction.

14. A polarizing structure, comprising:
a pressure sensitive adhesive layer, comprising a light incident surface and a light emitted surface on which are provided a plurality of triangular-prism-shaped grooves, and an angle between a side surface of the triangular-prism-shaped groove and the light incident surface is an acute angle; the light entering the pressure sensitive adhesive layer through the light incident surface and emitted from the light emitted surface;
an optical compensation film, formed on a light emitted surface of the pressure sensitive adhesive layer; wherein a first refractive index of the optical compensation film is greater than a second refractive index of the pressure sensitive adhesive layer; a surface of the optical compensation film contacting the light emitted surface provided with a plurality of triangular prism protruding structures associated with the triangular prism grooves in shape and size; the optical compensation film is a single optical axis negative compensation film; the single optical axis negative compensation film inside is filled with liquid crystals; and
a polarizer formed on the optical compensation film; the polarizer having an absorption axis and a transmission axis; an optical axis of the liquid crystal being parallel to the transmission axis of the polarizer;
wherein the plurality of the triangular prism protruding structures are distributed in a two-dimensional matrix array on the light emitted surface.

15. A display device, comprising:
a backlight device, configured to provide a light source;
a display panel, placed on a side of the backlight device, configured to display an image;
wherein the display panel comprises a polarizing structure, which comprises:
a pressure sensitive adhesive layer, comprising a light incident surface and a light emitted surface on which are provided a plurality of grooves having a predetermined shape, and an angle between a side surface of the groove and the light incident surface being an acute angle; the light entering the pressure sensitive adhesive layer through the light incident surface and emitted from the light emitted surface;
an optical compensation film, formed on the light emitted surface of the pressure sensitive adhesive layer; wherein a first refractive index of the optical compensation film is greater than a second refractive index of the pressure sensitive adhesive layer; a surface of the optical compensation film contacting the light emitted surface provided with a plurality of protruding structures associated with the groove in shape and size; the optical compensation film is a single optical axis negative compensation film; the single optical axis negative compensation film inside is filled with liquid crystals; and
a polarizer formed on the optical compensation film; the polarizer having an absorption axis and a transmission axis; an optical axis of the liquid crystal being parallel to the transmission axis of the polarizer;
wherein the protruding structure is a triangular prism protruding structure, and a plurality of the triangular prism protruding structures are distributed in a two-dimensional matrix array on the light emitted surface.

16. The display device of claim 15, wherein the display panel is a liquid crystal display panel.

* * * * *